Aug. 15, 1961  A. P. MOCERINO ET AL  2,996,111
MATERIAL HANDLING DEVICE
Filed Dec. 15, 1958

AUGUSTUS P. MOCERINO
EGISTO A. MOCERINO
*INVENTORS*

BY Lawrence J. Winter
ATTORNEY

United States Patent Office 2,996,111
Patented Aug. 15, 1961

2,996,111
MATERIAL HANDLING DEVICE
Augustus P. Mocerino, 153 Knapp Ave., Clifton, N.J., and Egisto A. Mocerino, 35 Myrtle Ave., Madison, N.J.
Filed Dec. 15, 1958, Ser. No. 780,334
3 Claims. (Cl. 158—13.6)

The present invention relates to a material handling device and more particularly to a material handling device provided with means for supplying a continuous quantity of heat thereto.

In working with certain types of bulk material, such as bituminous materials, for example, which are commonly used in construction work such as road building, in making driveways, covering roofs and the like, it is necessary that these materials be maintained in a semi-soft or plastic condition until they are applied in situ. This is because they rapidly cool off to set up or harden and once hardened cannot be used. As a consequence of this inherent characteristic of these materials, the work tools used in handling them become readily caked or encrusted with the hard material and necessitates frequent cleaning of the tools resulting in work stoppage and large maintenance costs.

One common method of removing the hardened caked materials from the tools used today is to heat the tool surfaces over an open flame or fire to permit the caked material to loosen and slide off. This method has not proved very effective because the tools must be cleaned after every few handlings of the material since they cool rapidly in the atmosphere and the cleaning time amounts to more than the work time of the tool. Another difficulty encountered is that the frequent heating by a direct or open flame destroys the temper of the metal tools used, as they are generally common tools and are not especially designed for handling the particular substance.

With the foregoing in mind, an object of the present invention is to provide a material handling device for use with bulk materials provided with means to prevent the material from caking or becoming encrusted thereon.

Another object of the present invention is to provide heating means incorporated in a material handling device to provide a continuous source or supply of heat to the work surface thereof.

Another object of the present invention is to provide heating means for supplying heat to the work surface of a material handling implement but which avoids any direct flame impingement thereon.

Another object of the present invention is to provide a material handling device having indirect heat means, that can be economically manufactured, for use with bituminous materials such as asphalt, tar, and the like and which utilizes inexpensive fuels such as fuel oil, kerosene, and the like.

A further object of the present invention is to provide a heated material handling device that can be used by inexperienced labor.

A still further object of the present invention is to provide a material handling device such as a shovel, rake, pitch fork, tine, or the like having indirect heating means and a fuel supply formed integral therewith that is readily adaptable for working with fast setting or hardening materials and eliminates the need for frequent cleaning of the tool.

The invention will be better understood when considered in connection with the accompanying drawing forming a part thereof and in which.

Figure 1:
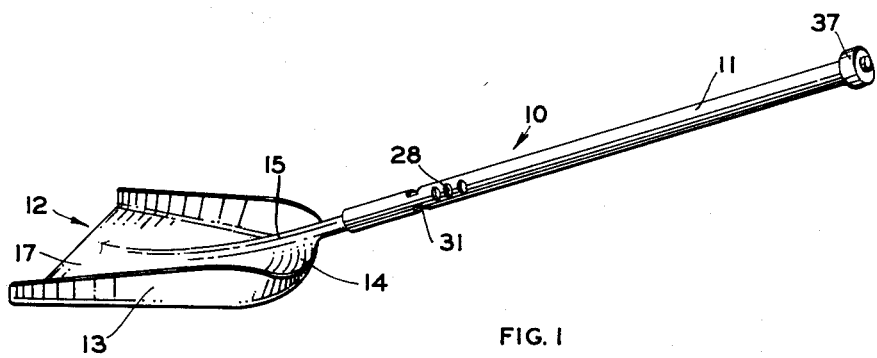
FIG. 1 shows the material handling device of the present invention shown as a shovel for the purpose of illustration.
Figure 2:
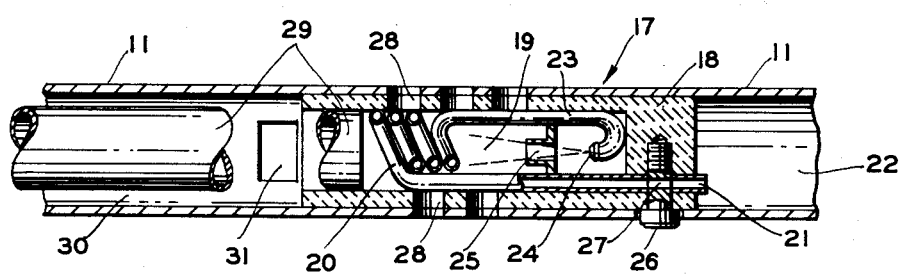
FIG. 2 is an enlarged detail view of the heating means incorporated in the shovel.

Referring to the figures the reference numeral 10 designates a material handling device embodying the present invention comprising a hollow tubular member or handle 11 having a blade or scoop 12 secured to the lower end thereof. The shovel blade or scoop 12 has its work surfaces formed or shaped like any conventional shovel with a bottom, sidewalls or rims 13 and an arcuate rear wall 14, except they comprise spaced double walls to form a heat compartment 16 positioned adjacent the bottom work surface 17 and the work surfaces of the side and rear walls 13 of the blade. Rear wall 14 is provided with a hollow tubular neck or sleeve 15 formed integral therewith and projecting out therefrom at an angle for securing the shovel handle thereto.

Hollow handle 11 contains firing means generally designated 17 consisting of a cylindrical member 18 made of a high temperature refractory material such as fire clay provided with a central recess or bore 19 therein. A fuel supply coil 20 is disposed in bore 19 and has an inlet section 21 extending through the upper end of member 18 into a fuel reservoir 22. The other end of the fuel coil is provided with an outlet section 23 having the extremity thereof bent or curved 180° in a direction toward coil 20. Coil section 23 has an orifice or nozzle 24 disposed on the tip thereof. Orifice 24 is positioned concentrically within bore 19 and has an annular baffle 25 spaced from the end thereof between coil sections 20 and 23 to guide or direct the flame emanating therefrom, as hereinafter described.

A fuel control valve 26 disposed in member 18 extends through inlet line 21 for controlling the flow of fuel through firing coil 20. Valve 26 is provided with a slot 27 extending therethrough so that rotation of the valve 90° in either direction will control the flow of fuel through the coil.

A plurality of complementary air inlet openings or ports 28 in members 11 and 18 provide communication with the atmosphere to supply air to the burner. A firing tube 29 is disposed concentrically within handle 11 with one end extending into heating chamber 16 adjacent the work surface of the shovel blade, and the opposite end into recess 19 to provide a gas passage for the flame and products of combustion from the burner member. The hot gases of combustion from burner 24 flow through tube 29 into chamber 16 passing in heat exchange relationship with the adjacent working surfaces of the shovel blade to keep the blade hot, and any material being handled thereon. Tube 29 has a smaller diameter than the inside diameter of handle 11 to define a gas passage 30 therebetween which communicates with a flue or gas outlet opening 31 disposed in handle 11 adjacent the lower end of member 18, for discharging the cooled gases from the handle after they have given up their heat to the blade.

Figure 3:
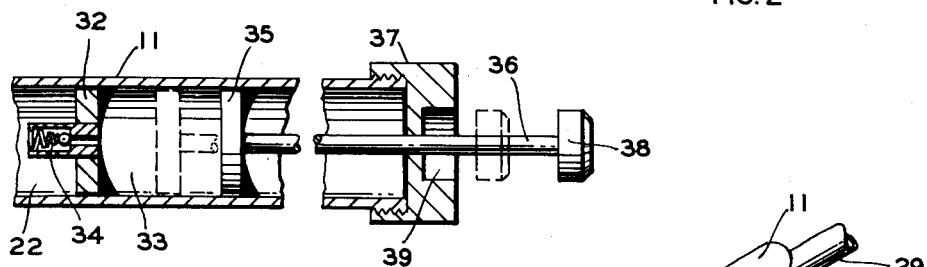
FIG. 3 is an enlarged detail view of the upper end of the shovel handle showing the pump means incorporated in the device.
Figure 4:
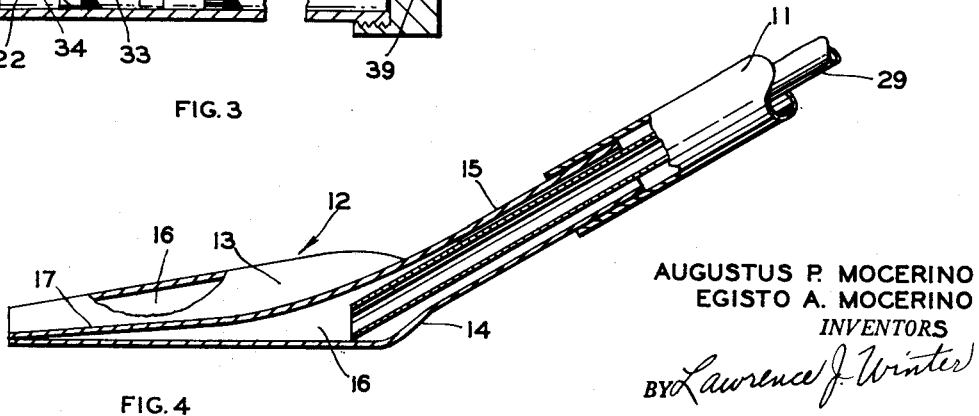
FIG. 4 is an enlarged detail view showing the lower end of the handle and the blade portion of the shovel.

A pump chamber 33 is provided in handle 11 adjacent the upper end of fuel reservoir 22. A circular partition 32 separates reservoir 22 from chamber 33 and has a check valve such as ball spring valve 34 therein normally closed as indicated in FIG. 3. A reciprocating piston 35 connected to a pump stem 36 is disposed in chamber 33. The pump stem extends through cap member 37 detachably connected to handle 11 and is provided with a handle 38 thereon adapted to seat in recess 39 of cap 37.

When it is desired to use the heated shovel of the present invention the fuel reservoir 22 is partially filled with kerosene by removing cap 37 from the top of the handle and filling the pump chamber 33 until it is partially filled with fuel. Thereafter, the cap is threaded on to the end of the shovel handle and the piston 35 is reciprocated so that a mixture of fuel and air under pressure is forced through check valve 34 into fuel reservoir 22. The pump is then operated until sufficient air pressure is built up in the reservoir so that when the fuel regulating valve 26 is opened a constant supply of fuel and air will be continuously forced through coil 20 to the burner nozzle.

The kerosene is brought to or near its vaporization temperature by opening valve 26 to fill coil 20 with the fuel and heating the coil and interior of the combustion chamber by external ignition means. This means may be an ignited kerosene soaked torch made of rags, paper or the like inserted into an opening 28. When the kerosene has reached its vaporization temperature, it leaves the orifice in a vaporous state, mist or spray and becomes ignited. Ignition will be self-sustaining as the flame from the orifice impinges on the coil and the incoming fuel therein to continuously heat it to its vaporization temperature and readily ignite it as it comes out of the orifice. Of course, if it is desired to use a more readily volatile fuel such as gasoline or methyl alcohol, it is not necessary to preheat the fuel filled coil as described, but the initial portion of fuel issuing from the orifice can be ignited by merely inserting a match into the combustion chamber.

Thereafter, valve 26 is again opened and adjusted to give the size of flame desired. The burner nozzle is preferably of a size to produce a flame that impinges upon the end of firing tube 29. The hot gases of combustion pass downwardly through the tube and enter heating chamber 16 so that they pass in heat exchange relationship with the work surfaces of the blade and maintain the surfaces hot to prevent material from hardening and adhering thereto. The cooled gases are discharged from the heating chamber through annular space 30 and thereafter pass out of the hollow handle through gas outlet 31.

Thus, it can readily be seen that the present invention provides a shovel having heated working surfaces so that when bituminous type materials such as asphalt, tar, and the like which have a tendency to rapidly set up or harden from cooling, can be handled without the shovel becoming caked or encrusted therewith to require constant cleaning thereof.

It will be further observed that the heated shovel can also be utilized where it is desired to have a heated surface for melting material handled thereby, as for example in snow and ice removal tasks.

In addition, the present invention provides a material handling device which provides a constant supply of fuel under pressure to the burner incorporated therein because of the pump means provided to force the fuel through the fuel coil to the burner nozzle.

It will also be noted that the burner arrangement of this invention permits the working surfaces of the shovel to be indirectly heated so that no deleterious effects are present to temper the metal of the shovel blade, thereby permitting materials used in conventional shovels to be used in carrying out the invention.

Inasmuch as various changes may be made in the form, location and relative arrangement of the several parts without departing from the essential characteristics of the invention, it will be understood that the invention is not to be limited except by the scope of the appended claims.

What is claimed is:

1. A heated shovel comprising a double walled blade forming a heat chamber adjacent the work surface, a hollow handle, heat generating means enclosed within said handle, a fire tube disposed within said handle extending between said heat generating means and said heat chamber for passage of combustion products to said heat chamber to heat said blade, and gas outlet means surrounding said fire tube for flowing cooled gases from said shovel.

2. A heated shovel comprising a blade formed by spaced walls defining a heat chamber adjacent the work surface, a hollow handle joined to said blade, heat generating means disposed entirely within said handle, a centrally disposed fire tube in said handle having its upper end in communication with said heat generating means and its lower end extending into said heat chamber to flow combustion products thereto, and a gas outlet passage surrounding said fire tube for discharging said combustion products from the shovel.

3. A heated shovel comprising a blade formed by spaced walls providing a heat chamber adjacent the work surface, a hollow handle, heat generating means enclosed entirely within said handle, a central fire tube in said handle spaced from the inner surface of the handle to form an annular gas outlet passage therearound, said fire tube having its upper end disposed to receive hot gas products from said heat generating means and its lower end extending into said heat chamber to flow said products therethrough to keep said work surface hot, said handle having a gas outlet opening therein adjacent the upper end of said gas passage for discharging combustion products from the shovel.

References Cited in the file of this patent

UNITED STATES PATENTS

| | | |
|---|---|---|
| 143,470 | Shinn | Oct. 7, 1873 |
| 768,923 | Wiedersheim | Aug. 30, 1904 |
| 774,064 | Gilbert | Nov. 1, 1904 |
| 997,259 | Barber | July 11, 1911 |
| 1,298,200 | Gorgey | Mar. 25, 1919 |
| 1,451,195 | Bagley | Apr. 10, 1923 |

FOREIGN PATENTS

| | | |
|---|---|---|
| 555,849 | France | Apr. 3, 1923 |